(12) United States Patent
Hawkins et al.

(10) Patent No.: US 8,907,518 B1
(45) Date of Patent: Dec. 9, 2014

(54) HYBRID AEROGENERATOR

(71) Applicants: Adrian Hawkins, Hood River, OR (US); Marty Schmitz, Parkdale, OR (US)

(72) Inventors: Adrian Hawkins, Hood River, OR (US); Marty Schmitz, Parkdale, OR (US)

(*) Notice: Subject to any disclaimer, the term of this patent is extended or adjusted under 35 U.S.C. 154(b) by 0 days.

(21) Appl. No.: 13/958,666

(22) Filed: Aug. 5, 2013

(51) Int. Cl.
*F03B 9/00* (2006.01)
*F03D 9/00* (2006.01)
*H02P 31/00* (2006.01)

(52) U.S. Cl.
CPC ............... *H02P 31/00* (2013.01); *F03D 9/002* (2013.01)
USPC ............................................. 290/55; 290/44

(58) Field of Classification Search
USPC ........................................ 290/44, 55
See application file for complete search history.

(56) References Cited

U.S. PATENT DOCUMENTS

| | | | | |
|---|---|---|---|---|
| 6,911,743 B2* | 6/2005 | Ishizaki | | 290/55 |
| 8,174,138 B2* | 5/2012 | Castelli Dezza et al. | | 290/44 |
| 8,203,228 B2* | 6/2012 | Smith | | 290/55 |
| 8,680,702 B2* | 3/2014 | Castelli Dezza et al. | | 290/44 |
| 2010/0276938 A1* | 11/2010 | Smith | | 290/55 |
| 2013/0026758 A1* | 1/2013 | Moretti | | 290/44 |

FOREIGN PATENT DOCUMENTS

KR  10-2010-0121194 A  11/2010

\* cited by examiner

*Primary Examiner* — Tho D Ta
(74) *Attorney, Agent, or Firm* — Revolution IP, PLLC

(57) ABSTRACT

Disclosed therein is a hybrid aerogenerator including: blades rotating by winds; a main rotary shaft disposed on a fixed structure to rotatably mount the blades; an engine part having an engine shaft and generating rotary power using fossil fuel; a generation part having a generation shaft and generating electric currents by rotary power of the generation shaft; transferring means adapted to connect at least one of the main rotary shaft and the engine shaft to the generation shaft; a sensor adapted to measure RPM (Revolution Per Minute) of the blades; a controlling part adapted to control the transferring means and the engine part according to the RPM measured by the sensor; and an electricity storing part adapted to store the electric currents of the generation part.

10 Claims, 5 Drawing Sheets

HYBRID AEROGENERATOR

BACKGROUND OF THE INVENTION

1. Field of the Invention

The present invention relates to a hybrid aerogenerator, and more particularly, to a hybrid aerogenerator, which can continuously generate and store electric currents even though necessary winds are not generated so as to keep a uniform electricity generation rate.

2. Background Art

In general, an aerogenerator is one of electric generators, which obtains rotary power by rotating blades using wind generated in nature, converts the rotary power into electric energy, and supplies the electric energy to regions which require electricity.

Such an aerogenerator is disclosed in Korean Patent Laid-open No. 10-2010-0121194. In Korean Patent Laid-open No. 10-2010-0121194, the aerogenerator includes a body disposed on the top of a support shaft standing on the ground and rotor blades rotatably disposed on the body.

Moreover, the body includes a generator and rotary power transferring means disposed therein, and the rotary power transferring means has a plurality of gears to increase the rotary power of the rotor blades and transfer the rotary power to the generator, and thereby, can convert wind power into electric energy.

However, the aerogenerator has a problem in that its effectiveness is deteriorated because the aerogenerator has a low generation quantity when there are not sufficient winds.

Of course, the aerogenerator is installed in regions where an average annual wind speed is above the reference wind speed, but the generator quantity is changing because the present environment may be different from the time when the aerogenerator was installed due to the weather anomaly by global warming.

It would be good if the wind speed is increased and the generation quantity is increased by the changing environment, but, on the contrary, if the wind speed and the generation quantity are decreased, the aerogenerator may fall into disuse due to ruinous installation costs or maintenance fees.

Therefore, developments of aerogenerators which can basically generate electric power by wind speeds and can continuously generate electric power even though wind speed is less than the reference wind speed have been demanded.

SUMMARY OF THE INVENTION

Accordingly, the present invention has been made to solve the above-mentioned problems occurring in the prior arts, and it is an object of the present invention to provide a hybrid aerogenerator, which includes: a main rotary shaft disposed on a fixed structure to rotatably mount the blades rotating by winds; an engine part having an engine shaft and generating rotary power using fossil fuel; a generation part having a generation shaft and generating electric currents by rotary power of the generation shaft; transferring means adapted to connect at least one of the main rotary shaft and the engine shaft to the generation shaft; a sensor adapted to measure RPM (Revolution Per Minute) of the blades; a controlling part adapted to control the transferring means and the engine part according to the RPM measured by the sensor; and an electricity storing part adapted to store the electric currents of the generation part, thereby generating and storing electric currents by rotating by winds and continuously generating necessary electric currents by generating rotary power using fossil fuel even though there are not sufficient wind speed.

To achieve the above object, the present invention provides a hybrid aerogenerator including: blades rotating by winds; a main rotary shaft disposed on a fixed structure to rotatably mount the blades; an engine part having an engine shaft and generating rotary power using fossil fuel; a generation part having a generation shaft and generating electric currents by rotary power of the generation shaft; transferring means adapted to connect at least one of the main rotary shaft and the engine shaft to the generation shaft; a sensor adapted to measure RPM (Revolution Per Minute) of the blades; a controlling part adapted to control the transferring means and the engine part according to the RPM measured by the sensor; and an electricity storing part adapted to store the electric currents of the generation part.

Preferably, the transferring means includes: a wind power transferring part connecting the main rotary shaft to the generation shaft so as to transfer the rotary power of the blades to the generation shaft; and an engine transferring part connecting the engine shaft to the generation shaft so as to transfer the rotary power of the engine part to the generation shaft.

Moreover, the wind power transferring part includes: a transferring shaft disposed parallel with the main rotary shaft; a first connection portion adapted to transfer the rotary power of the main rotary shaft to the transferring shaft; a second connection portion adapted to transfer the rotary power of the transferring shaft to the generation shaft; and a wind power clutch controlled by the controlling part, the wind power clutch being adapted to transfer rotary power of the second connection portion to the generation shaft by selectively connecting the second connection portion connected to the transferring shaft with the generation shaft.

Furthermore, each of the first connection portion and the second connection portion is one selected from a chain, a belt and a gear.

Additionally, the engine transferring part includes: a third connection portion adapted to transfer the rotary power of the engine shaft to the generation shaft; and an engine clutch controlled by the controlling part, the engine clutch being adapted to transfer the rotary power of the engine shaft to the generation shaft by selectively connecting the third connection portion with the generation shaft.

In addition, the third connection portion is one selected from a chain, a belt and a gear.

Moreover, the controlling part includes: a first mode that the main rotary shaft is connected to the generation shaft and the engine shaft is separated from the generation shaft so as to generate electric currents using only the rotary power of the blades, when the RPM measured by the sensor exceeds a predetermined RPM range; a second mode that the main rotary shaft is connected to the generation shaft and, at the same time, the engine shaft is connected to the generation shaft so as to generate electric currents by rotary powers of the blades and the engine part, when the RPM measured by the sensor comes within the predetermined RPM range; and a third mode that the main rotary shaft is separated from the generation shaft and the engine shaft is connected to the generation shaft so as to generate electric currents using only the rotary power of the engine part, when the RPM measured by the sensor is less than the predetermined RPM range.

Furthermore, the RPM range of the first mode is over 80 RPM and 300 RPM and less, the RPM range of the second mode is within the range of 30 RPM to 80 RPM, and the RPM range of the third mode is ORPM and more and below 30 RPM.

Additionally, the generation part further comprises a second sensor for measuring RPM of the generation shaft, and in the second mode and in the third mode, the controlling part controls the engine part in such a manner that the RPM measured by the second sensor is equal to the RPMs measured by the sensor and the second sensor in the first mode.

As described above, the hybrid aerogenerator according to the present invention can generate and store electric currents by rotating by winds and continuously generate necessary electric currents by generating rotary power using fossil fuel even though there are no sufficient winds.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Reference will be now made in detail to the preferred embodiment of the present invention with reference to the attached drawings.

It should be understood that the example embodiment of the present invention is not to limit the scope of the present invention but is just to exemplify the present invention, and can be changed in various ways falling within the technical spirit and the scope of the invention.

Figure 1:
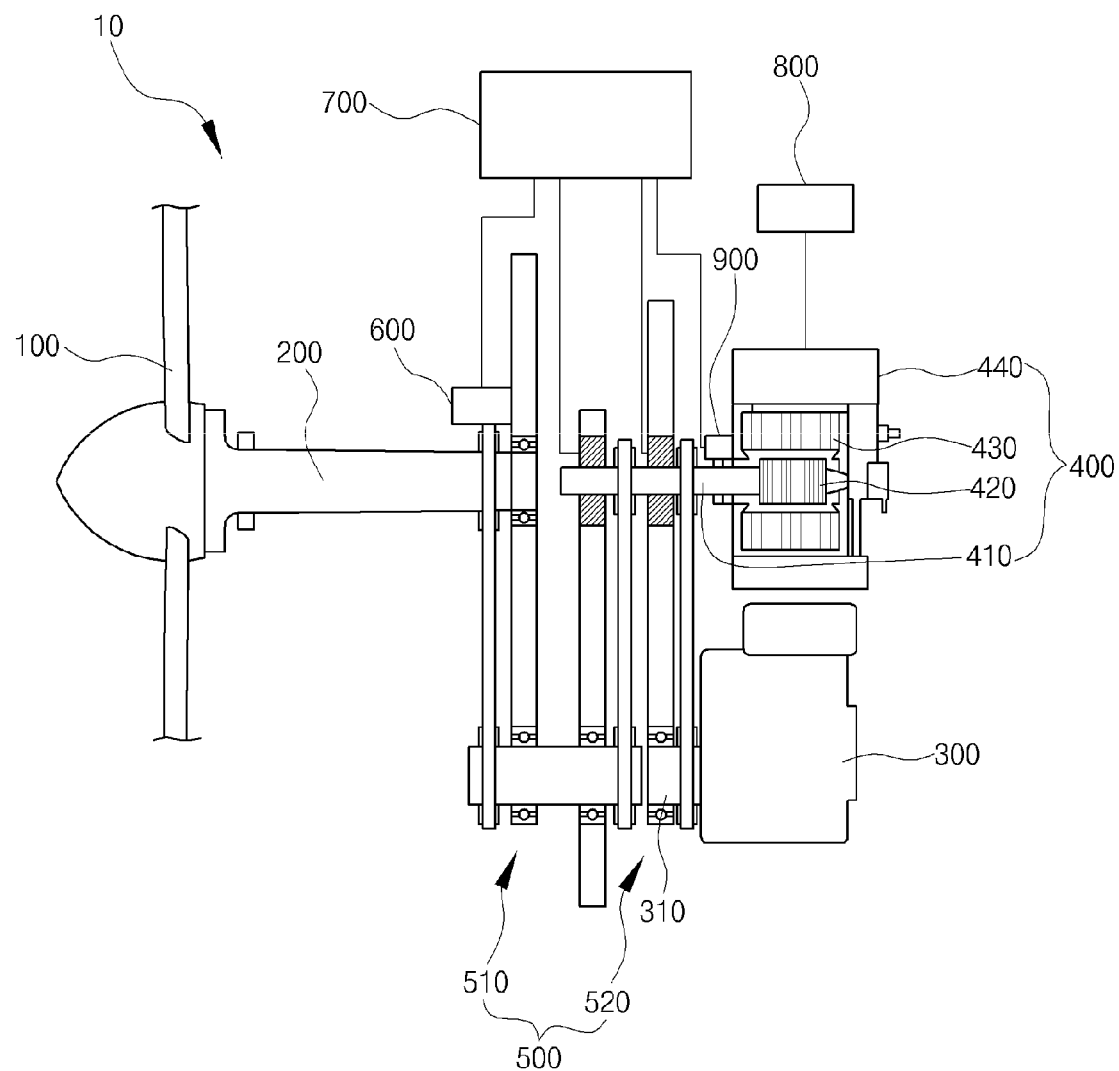
FIG. 1 is a view showing a hybrid aerogenerator according to the present invention.
Figure 2:
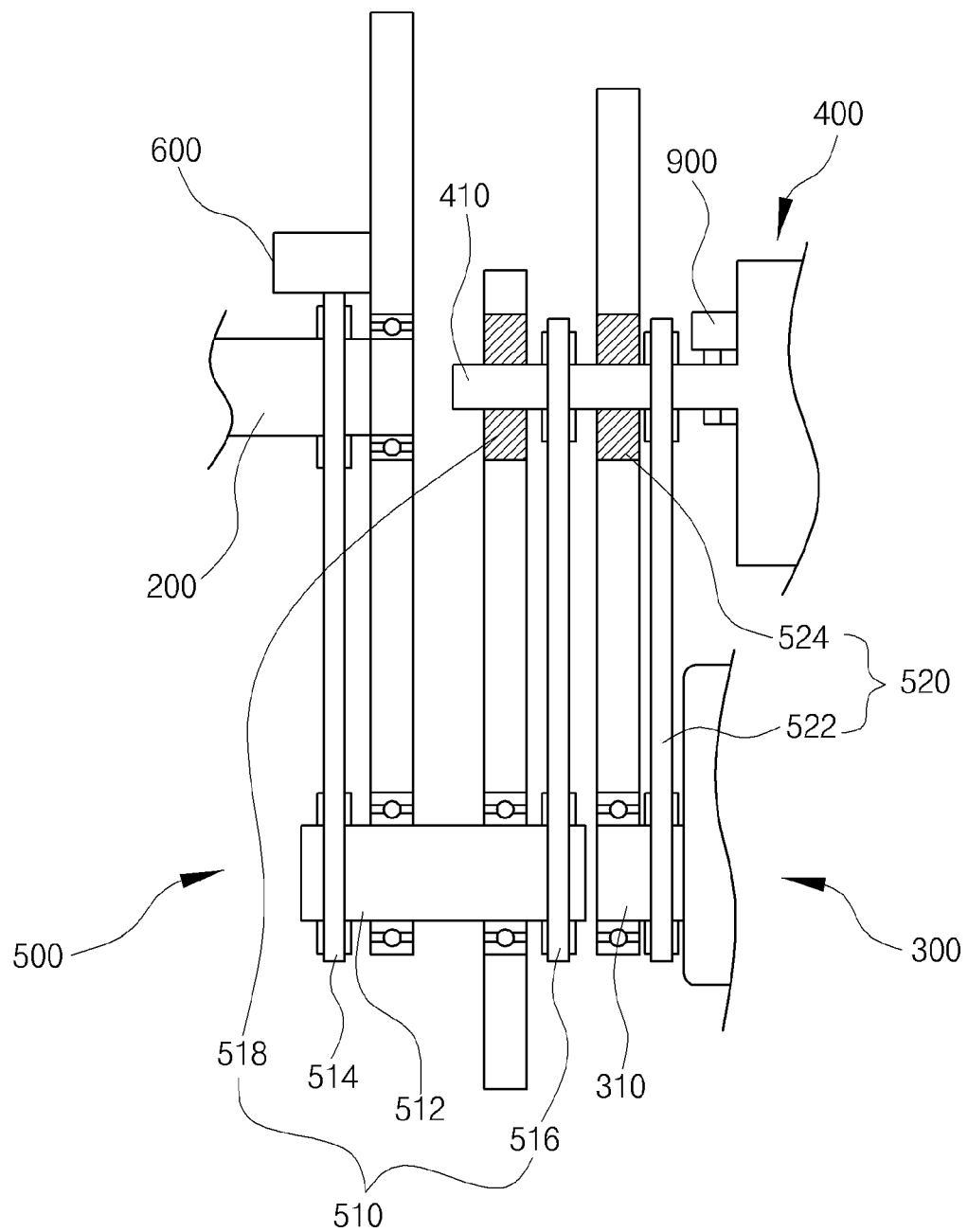
FIG. 2 is a view showing transferring means of the hybrid aerogenerator according to the present invention.
Figure 3:
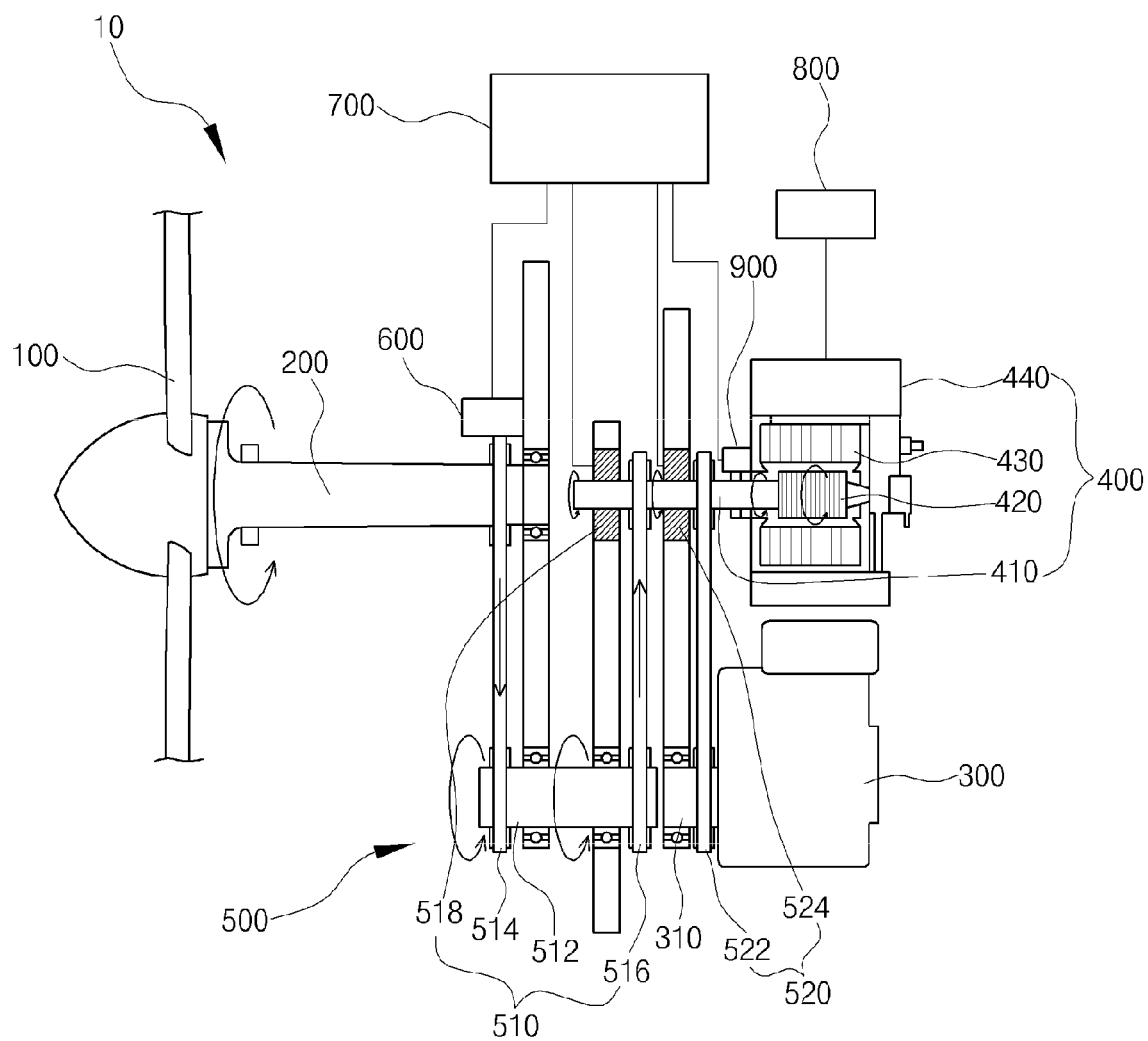
FIG. 3 is a view showing an operational state in a first mode of a controlling part of the hybrid aerogenerator.
Figure 4:
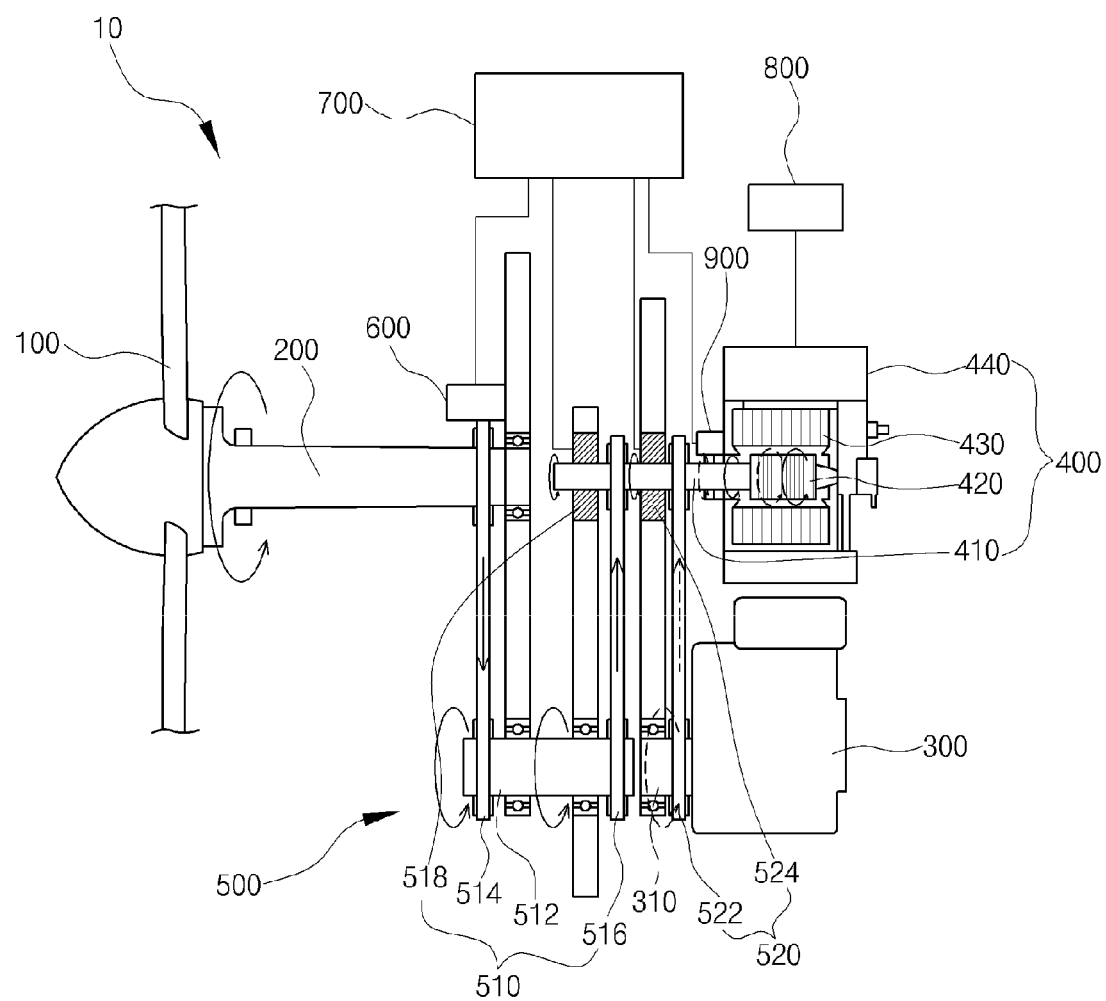
FIG. 4 is a view showing an operational state in a second mode of a controlling part of the hybrid aerogenerator.
Figure 5:
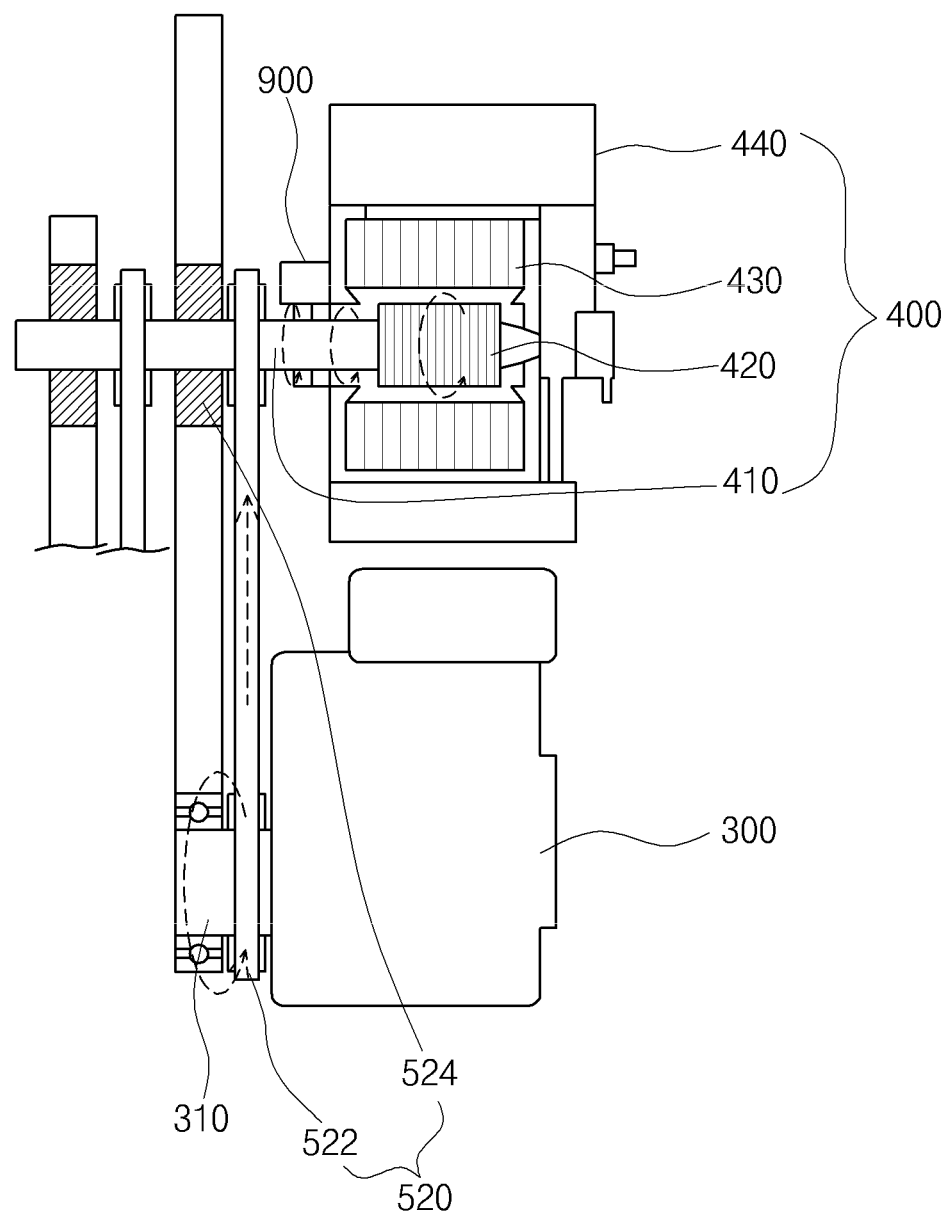
FIG. 5 is a view showing an operational state in a third mode of a controlling part of the hybrid aerogenerator.

FIG. 1 is a view showing a hybrid aerogenerator according to the present invention, FIG. 2 is a view showing transferring means of the hybrid aerogenerator, FIG. 3 is a view showing an operational state in a first mode of a controlling part of the hybrid aerogenerator, FIG. 4 is a view showing an operational state in a second mode of a controlling part of the hybrid aerogenerator, and FIG. 5 is a view showing an operational state in a third mode of a controlling part of the hybrid aerogenerator.

As shown in the drawings, the hybrid aerogenerator 10 includes blades 100, a main rotary shaft 200, an engine part 300, a generation part 400, transferring means 500, a sensor 600, a controlling part 700, and an electricity storing part 800.

First, the blades 100 are rotated by winds, and the main rotary shaft 200 is disposed on a fixed structure to rotatably mount the blades 100.

Moreover, the engine part 300 has an engine shaft 310 and generates rotary power using fossil fuel, and the generation part 400 has a generation shaft 410 and generates electric currents by rotation of the generation shaft 400.

The transferring means 500 is disposed to connect at least one of the main rotary shaft 200 and the engine shaft 310 to the generation shaft 410, and hence, at least one of the blades 100 and the engine part 300 is selectively connected to the generation shaft 410 of the generation part 400.

Furthermore, the sensor 600 is to measure RPM (Revolution Per Minute) of the blades 100 rotating by winds, and measures RPM in real time.

The controlling part 700 is to control the transferring means 500 and the engine part 300 according to the RPM measured by receiving a signal from the sensor 600. When the controlling part 700 controls the transferring means 500 to selectively use the rotary powers of the blades 100 and the engine part 300, the generator part 400 can generate electric currents.

Of course, the engine part 300 is controlled in operation according to the RPM measured in the sensor 600 by the controlling part 700.

Here, the generation part 400 includes: a rotor 420 which has magnetism and is disposed on the generation shaft 410 and rotated together with the generation shaft 410; an induction coil 430 generating induction voltage in response to the rotor 420; and a converting part 440 for converting the induction voltage generated in the induction coil 430 into electric currents.

So, the generation part 400 can generate electric currents by the rotation of the generation shaft 410.

Additionally, the electricity storing part 800 stores the electric currents of the generation part 400.

Here, as shown in FIG. 2, the transferring means 500 includes a wind power transferring part 510 and an engine transferring part 520.

The wind power transferring part 510 transfers the rotary power of the blades 100 rotating by winds to the generation part 400, and the engine transferring part 520 transfers the rotary power of the engine part 300 to the generation part 400.

In other words, the wind power transferring part 510 transfers the rotary power of the blades 100 by winds to the generation shaft 410 which is connected with the main rotary shaft 200, and hence, the generation part 400 generates electric currents.

Moreover, the engine transferring part 520 transfers the rotary power of the engine part 300 to the generation shaft 410 which is connected with the engine shaft 310, and hence, the generation part 400 generators electric currents.

Such a wind power transferring part 510 will be described in more detail. The wind power transferring part 510 includes a transferring shaft 512, a first connection portion 514, a second connection portion 516, and a wind power clutch 518.

The transferring shaft 512 is parallel with the main rotary shaft 200, and the first connection portion 514 is disposed to transfer the rotary power of the main rotary shaft 200 to the transferring shaft 512.

Furthermore, the second connection portion 516 is disposed to transfer the rotary power of the transferring shaft 512 to the generation shaft 410, and the wind power clutch 518 is controlled by the controlling part 700 in such a way as to selectively connect the second connection portion 516 connected to the transferring shaft 512 to the generation shaft 410 to thereby transfer the rotary power of the second connection portion 516 to the generation shaft 410.

Here, each of the first connection portion 514 and the second connection portion 516 is one selected from a chain, a belt and a gear, and the rotary power of the blades 100 rotated by winds and the rotary power of the main rotary shaft 200 rotated by the blades 100 are transferred to the generation shaft 410 of the generation part 400 by the first connection portion 514 and the second connection portion 516.

Of course, it is natural that the rotary power of the second connection portion 516 is transferred to the generation shaft 410 by the wind power clutch 518 controlled by the controlling part 700.

Additionally, the engine transferring part 520 includes a third connection portion 522 and an engine clutch 524, and transfers the rotary power of the engine 300 to the generation part 400.

First, the third connection portion 522 is disposed to transfer the rotary power of the engine shaft 310 by the engine part 300 to the generation shaft 410, and the engine clutch 524 is controlled by the controlling part 700 in such a way as to selectively connect the third connection portion 522 to the generation shaft 410 to thereby transfer the rotary power of the engine shaft 310 to the generation shaft 410.

Of course, the engine part 300 is controlled by the controlling part 700 so as to be operated according to the RPM measured by the sensor 600.

Here, the third connection portion 522 is one selected from a chain, a belt and a gear, and the rotary power of the engine part 300 using fossil fuel is transferred to the generation shaft 410 of the generation part 400 by the third connection portion 522.

Furthermore, the engine clutch 524 is controlled by the controlling part 700, and it is natural that the rotary power of the third connection portion 522 is transferred to the generation shaft 410 by the controlled engine clutch 524.

In this instance, the fossil fuel of the engine part 300 is one selected from LPG, gasoline, and diesel.

Here, the controlling part 700 controls the transferring means 500 and the engine part 300 according to the RPM measured by the sensor 600, and has a first mode, a second mode and a third mode.

First, as shown in FIG. 3, in the first mode, when the RPM measured by the sensor 600 exceeds a predetermined RPM range, the main rotary shaft 200 is connected to the generation shaft 410 and the engine shaft 310 is separated from the generation shaft 410.

In the first mode, after the engine part 300 is stopped, the controlling part 700 controls the wind power transferring part 510 of the transferring means 500 so as to transfer the rotary power of the blades 100 and the main rotary shaft 200 to the generation part 400, and controls the engine transferring part 520 so as to separate the engine transferring part 520 from the generation part 400.

In other words, the controlling part 700 connects the second connection portion 516 to the generation shaft 410 by controlling the wind power clutch 518 of the wind power transferring part 510 and separates the third connection portion 522 from the generation shaft 410 by controlling the engine clutch 524 of the engine transferring part 520, so that the hybrid aerogenerator according to the present invention generates electric currents using only the blades 100.

Moreover, as shown in FIG. 4, in the second mode, when the RPM measured by the sensor 600 comes within the predetermined RPM range, the main rotary shaft 200 is connected to the generation shaft 410, and at the same time, the engine shaft 310 is connected to the generation shaft 410 so as to generate electric currents by rotary powers of the blades 100 and the engine part 300.

In the second mode, after operating the engine part 300, the controlling part 700 controls the wind power transferring part 510 of the transferring means 500 so as to transfer rotary power of the main rotary shaft 200 to the generation part 400 and controls the engine transferring part 520 so as to transfer rotary power of the engine shaft 310 to the generation part 400.

In other words, the controlling part 700 connects the second connection portion 516 to the generation shaft 410 by controlling the wind power clutch 518 of the wind power transferring part 510 and connects the third connection portion 522 to the generation shaft 410 by controlling the engine clutch 524 of the engine transferring part 520, so that the hybrid aerogenerator according to the present invention generates electric currents using the rotary power of the blades 100 and the rotary power of the engine part 300 at the same time.

In this instance, the controlling part 700 controls the RPM of the engine part 300 according to the RPM measured by the sensor 600, and controls the engine part 300 in such a manner that the RPM of the generation shaft 410 in the second mode is equal to the RPM of the generation shaft 410 in the first mode.

For this, the generation part 400 further includes a second sensor 900 to measure RPM of the generation shaft 410.

Moreover, as shown in FIG. 5, in the third mode, when the RPM measured by the sensor 600 is less than the predetermined RPM range, the main rotary shaft 200 is separated from the generation shaft 410 and the engine shaft 310 is connected to the generation shaft 410 so as to generate electric currents using only the rotary power of the engine part 300.

In the third mode, after operating the engine part 300, the controlling part 700 controls the wind power transferring part 510 of the transferring means 500 so as to separate the main rotary shaft 200 from the generation part 400 and controls the engine transferring part 520 so as to transfer rotary power of the engine shaft 310 to the generation part 400.

In other words, the controlling part 700 separates the second connection portion 516 from the generation shaft 410 by controlling the wind power clutch 518 of the wind power transferring part 510 and connects the third connection portion 522 to the generation shaft 410 by controlling the engine clutch 524 of the engine transferring part 520, so that the hybrid aerogenerator according to the present invention generates electric currents using only the rotary power of the engine part 300.

In this instance, the controlling part 700 controls the RPM of the engine part 300 according to the RPM measured by the sensor 600, and controls the engine part 300 in such a manner that the RPM of the generation shaft 410 in the third mode is equal to the RPM of the generation shaft 410 in the first mode.

For this, the generation part 400 further includes a second sensor 900 to measure RPM of the generation shaft 410.

Here, the predetermined RPM is within the range of 30 RPM to 80 RPM, and if the RPM measured by the sensor 600 is within the range of 30 RPM to 80 RPM, the controlling part 700 carries out the second mode to thereby generate electric currents using the rotary powers of the blades 100 and the engine part 300.

Furthermore, if the RPM measured by the sensor 600 is over 80 RPM and 300 RPM and less, the controlling part 700 carries out the first mode to thereby generate electric currents using only the rotary power of the blades 100.

Additionally, if the RPM measured by the sensor 600 is 0RPM and more and below 30 RPM, the controlling part 700 carries out the third mode to thereby generate electric currents using only the rotary power of the engine part 300.

Therefore, the hybrid aerogenerator according to the present invention can continuously generate electric currents not only when the sufficient wind blows but also when there is no wind.

What is claimed is:

1. A hybrid aerogenerator comprising:
   blades rotating by winds;
   a main rotary shaft disposed on a fixed structure to rotatably mount the blades;
   an engine part having an engine shaft and generating rotary power using fossil fuel;
   a generation part having a generation shaft and generating electric currents by rotary power of the generation shaft;

transferring means adapted to connect at least one of the main rotary shaft and the engine shaft to the generation shaft;

a sensor adapted to measure RPM (Revolution Per Minute) of the blades;

a controlling part adapted to control the transferring means and the engine part according to the RPM measured by the sensor; and an electricity storing part adapted to store the electric currents of the generation part.

2. The hybrid aerogenerator according to claim 1, wherein the transferring means comprises:

a wind power transferring part connecting the main rotary shaft to the generation shaft so as to transfer the rotary power of the blades to the generation shaft; and an engine transferring part connecting the engine shaft to the generation shaft so as to transfer the rotary power of the engine part to the generation shaft.

3. The hybrid aerogenerator according to claim 2, wherein the wind power transferring part comprises:

a transferring shaft disposed parallel with the main rotary shaft;

a first connection portion adapted to transfer the rotary power of the main rotary shaft to the transferring shaft;

a second connection portion adapted to transfer the rotary power of the transferring shaft to the generation shaft; and a wind power clutch controlled by the controlling part, the wind power clutch being adapted to transfer rotary power of the second connection portion to the generation shaft by selectively connecting the second connection portion connected to the transferring shaft with the generation shaft.

4. The hybrid aerogenerator according to claim 3, wherein each of the first connection portion and the second connection portion is one selected from a chain, a belt and a gear.

5. The hybrid aerogenerator according to claim 2, wherein the engine transferring part comprises:

a third connection portion adapted to transfer the rotary power of the engine shaft to the generation shaft; and an engine clutch controlled by the controlling part, the engine clutch being adapted to transfer the rotary power of the engine shaft to the generation shaft by selectively connecting the third connection portion with the generation shaft.

6. The hybrid aerogenerator according to claim 5, wherein the third connection portion is one selected from a chain, a belt and a gear.

7. The hybrid aerogenerator according to claim 1, wherein the controlling part comprises:

a first mode that the main rotary shaft is connected to the generation shaft and the engine shaft is separated from the generation shaft so as to generate electric currents using only the rotary power of the blades, when the RPM measured by the sensor exceeds a predetermined RPM range;

a second mode that the main rotary shaft is connected to the generation shaft and, at the same time, the engine shaft is connected to the generation shaft so as to generate electric currents by rotary powers of the blades and the engine part, when the RPM measured by the sensor comes within the predetermined RPM range; and a third mode that the main rotary shaft is separated from the generation shaft and the engine shaft is connected to the generation shaft so as to generate electric currents using only the rotary power of the engine part, when the RPM measured by the sensor is less than the predetermined RPM range.

8. The hybrid aerogenerator according to claim 7, wherein the RPM range of the first mode is over 80 RPM and 300 RPM and less, the RPM range of the second mode is within the range of 30 RPM to 80 RPM, and the RPM range of the third mode is 0 RPM and more and below 30 RPM.

9. The hybrid aerogenerator according to claim 7, wherein the generation part further comprises a second sensor for measuring RPM of the generation shaft, and in the second mode and in the third mode, the controlling part controls the engine part in such a manner that the RPM measured by the second sensor is equal to the RPMs measured by the sensor and the second sensor in the first mode.

10. The hybrid aerogenerator according to claim 1, wherein the fossil fuel of the engine part is one selected from LPG, gasoline, and diesel.

* * * * *